United States Patent [19]

Chiang

[11] Patent Number: 5,546,670
[45] Date of Patent: Aug. 20, 1996

[54] MULTI-PURPOSE MEASURING INSTRUMENT FOR WOOD WORKING MACHINES

[76] Inventor: Vance Chiang, P.O. Box 63-150, Taichung, Taiwan

[21] Appl. No.: 318,100

[22] Filed: Oct. 5, 1994

[51] Int. Cl.⁶ ................................................ B27G 23/00
[52] U.S. Cl. ................................ 33/640; 33/384; 33/534; 33/DIG. 1
[58] Field of Search ............................. 33/42, 201, 202, 33/379, 384, 485, 534, 628, 630, 632, 640, 641, DIG. 1; 83/525.15, 525.17, 525.18, 525.19

[56] References Cited

U.S. PATENT DOCUMENTS

| | | | |
|---|---|---|---|
| 1,817,372 | 8/1931 | Heald | 33/641 |
| 2,171,616 | 9/1939 | Wilkerson | 33/384 |
| 2,747,291 | 5/1956 | Snyder | 33/DIG. 1 |
| 2,884,965 | 5/1959 | Stahl | 33/640 |
| 3,205,586 | 9/1965 | Mullen | 33/640 |
| 4,476,757 | 10/1984 | Morris | 83/446 |
| 5,168,637 | 12/1992 | Gibson | 33/640 |

Primary Examiner—William A. Cuchlinski, Jr.
Assistant Examiner—G. Bradley Bennett

[57] ABSTRACT

A multi-purpose measuring instrument for wood working machines including a body having a horizontal side and a vertical side. The edge of the horizontal side is provided with magnets and the vertical side is provided with slide blocks capable of longitudinal sliding movement and being positioned. The slide blocks may be used in measuring the height of the blade of the wood working machine. A circular level set is movably and rotatably provided in the center of the body. The level set consists of inner rings, outer rings and a bubble tube. The outer rings may be turned to a desired degree and angle adjustment of workpieces is achieved by adjusting the rings and the position of the bubble in the bubble tube, providing multiple measuring functions.

4 Claims, 7 Drawing Sheets

MULTI-PURPOSE MEASURING INSTRUMENT FOR WOOD WORKING MACHINES

TECHNICAL FIELD

The present invention relates generally to a measuring instrument for wood working machines, and more particularly to a multi-purpose measuring instrument for wood working machines.

BACKGROUND OF THE INVENTION

As known in the art, when a wood working machine is to be operated, an adjustable featherboard structure such as that disclosed in U.S. Pat. No. 4,476,757 is required to fix the machine onto the working table for adjusting the forward and backward movements and clamping workpieces of various width in sawing operations. Then if a workpiece with a preset angle has to be sawn, a protractor or level is further needed. In other words, all these belong to single-function operations. Very often, various kinds of measuring instruments have to be prepared in doing a sawing job, otherwise, sawing cannot be proceeded. Moreover, these instruments occupy space and are not convenient to use; they may also be easily misplaced or lost.

In view of the aforesaid, improvement is needed to eliminate the above drawbacks in the prior art.

SUMMARY OF THE INVENTION

The primary object of the present invention is to provide a multi-purpose measuring instrument for wood working machines, wherein positioning of the machine and measurement may be done at the same time, eliminating the trouble of using various clamps and instruments as in the prior art.

BRIEF DESCRIPTION OF THE DRAWINGS

The foregoing and other features and advantages of the present invention will be more clearly understood from the following detailed description and the accompanying drawings, in which.

DESCRIPTION OF PREFERRED EMBODIMENTS

Figure 1:
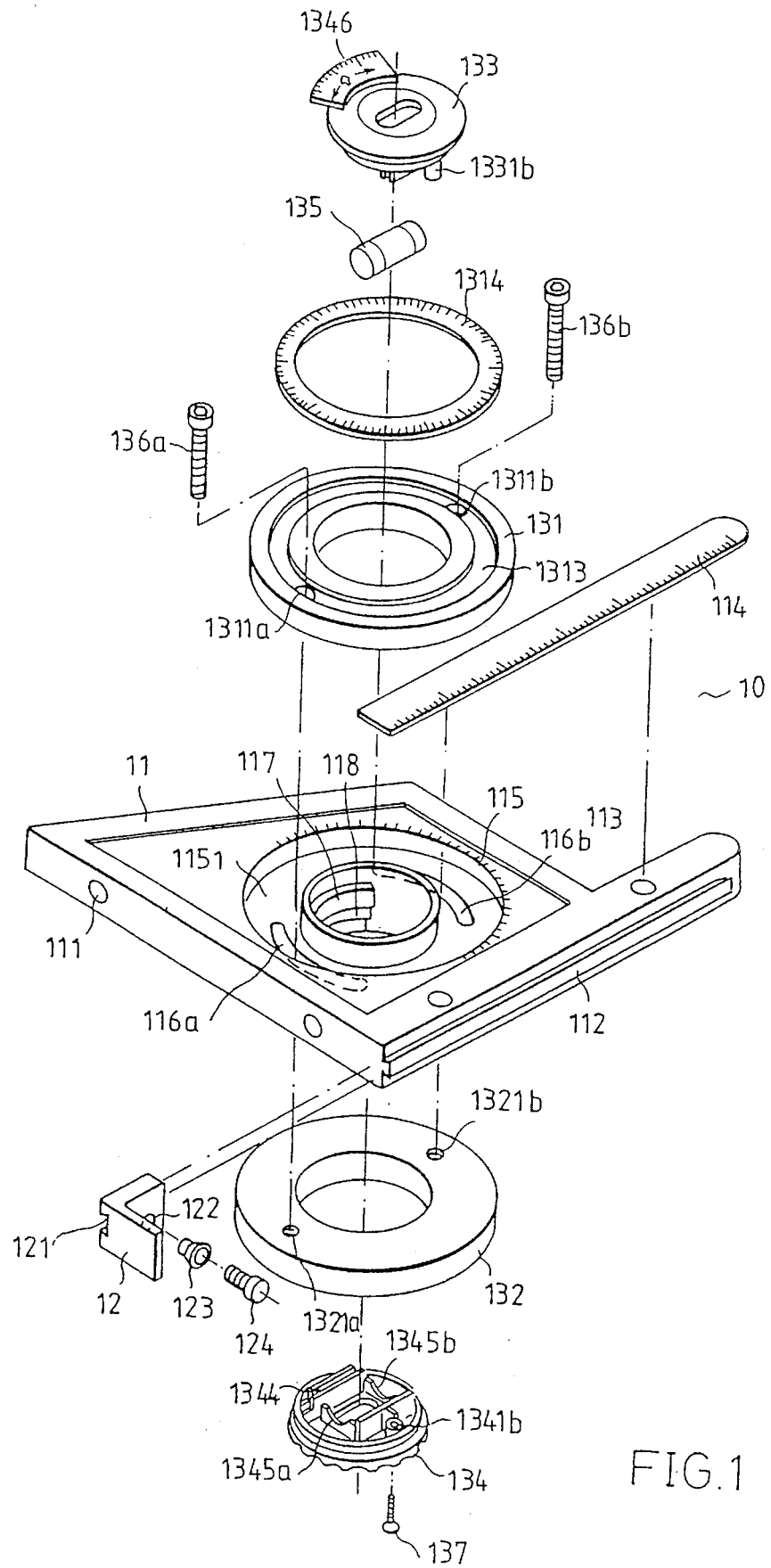
FIG. 1 is a perspective exploded view of a first preferred embodiment of the present invention.

With reference to FIG. 1, a multi-purpose measuring instrument 10 for wood working machines of the present invention comprises a body 11 formed by plastic injection molding, the body 11 having at least a horizontal side and a vertical side. The horizontal side is provided with plural magnets in one edge thereof, and one vertical side is configured to be a dovetailed strip 112 for a slide block 12 to be fitted thereon pivotally. Plural magnets 113 are also provided in the horizontal edge of the dovetailed strip 112 for attracting a steel ruler 114 positioned thereon. The steel ruler 114 is graduated both in inches and centimeters. A stepped circular hole 115 is provided in the center of the body 11. Its cross-section is in the shape of an "I". Its upper end 1151 and lower end 1152 have comparatively greater bores, and two curved slots 116a and 116b connecting the upper and lower ends 1151, 1152 vertically are correspondingly provided on two sides of the bottom of the circular hole 115. Two corresponding flanges 117, 118 each of a different thickness are provided in the center of the circular hole 115 for separating the two curved slots 116a and 116b and holding a level set 13 which provides twice angle adjustment to reset to zero.

The slide block 12 is an L-shaped body having a dovetailed groove 121 in one longitudinal side thereof. A round hole 122 is provided in the center of the slide block 12. A set of bolt which consists of a bolt 124 and a nut 123 is inserted into the round hole 122 to press against the dovetailed strip 112 of the body 11. The bolt and may be moved axially and positioned.

Figure 3:
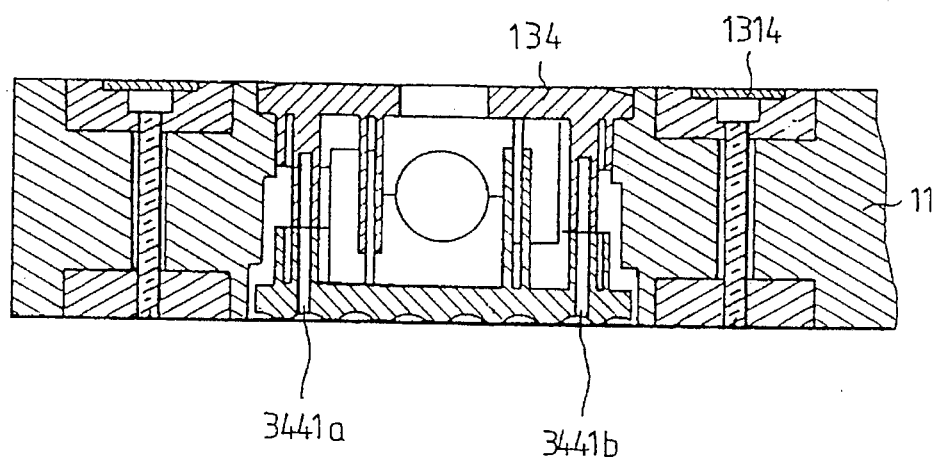
FIG. 3 is a sectional view of a second preferred embodiment of the present invention.

The level set 13 which may be twice adjusted and returned to zero consists of an upper outer ring 131 and a lower outer ring 132, an upper inner ring 133 and a lower inner ring 134, and a bubble tube 135 having therein a bubble (not shown in the drawings). Reference is now made to FIG. 3, wherein the upper and lower outer rings 131, 132 are ring-shaped. The circumferential edge of the upper outer ring 131 is provided with circular holes 1311a, 1311b, and the lower outer ring 132 is provided with screw holes 1321a, 1321b. The upper and lower outer rings are positioned above and below the two openings 1151, 1152 of the circular hole 115. Screws 136a, 136b individually pass through the corresponding curved slots 116 to lock the upper and lower outer rings 131, 132 together, so that the upper and lower outer rings 131, 132 may turn within the limited area of the curved slots 116. The upper surface of the upper outer ring 131 is provided with an annular groove 1313 for receiving a graduated ring 1314. The ring is graduated in 360 degrees. The upper and lower inner rings 133, 134 are respectively provided on upper and lower flanges 117, 118 within the circular hole 115. The upper and lower inner rings 133, 134 have round tubes 1331a, 1331b, 1341a (not shown), 1341b for insertion of screws 137 therethrough. Substantially T-shaped insert pieces 1332 (not shown), 1342 (not shown) and slots 1333, 1343 (not shown) may be fitted together. Rectangular holes 1334 (not shown), 1344 are respectively provided in the center of the upper and lower inner rings 133, 134. The corresponding two sides of the holes 1334, 1344 are provided with semi-circular plates 1335a (not shown), 1335b (not shown), 1345a, 1345b, for holding and positioning the bubble tube 135. The bubble tube 135 is a conventional structure and is deemed unnecessary to describe in detail herein. The upper and lower outer rings 131, 132 may be adjusted to return to zero with the zero degree graduation aligning with the bubble which is in the center of bubble tube 135 and in a level position. Then the upper and lower inner rings 133, 134 are adjusted to a preset angle. The instrument is then placed on a sawing machine or a working table at a preset angle. A second level correction is executed using the bubble tube 135 to obtain a real angle standard. (This is because not all of the measured objects have an accurate level. The present invention provides a novel structure which is a breakthrough in conventional single level measurement. When it is used in conjunction with other structural components of the body 11, its effectiveness will be best displayed.) Furthermore, the upper inner ring 134 has a graduated sector plate 134 protruding from its circumferential edge.

Figure 2:
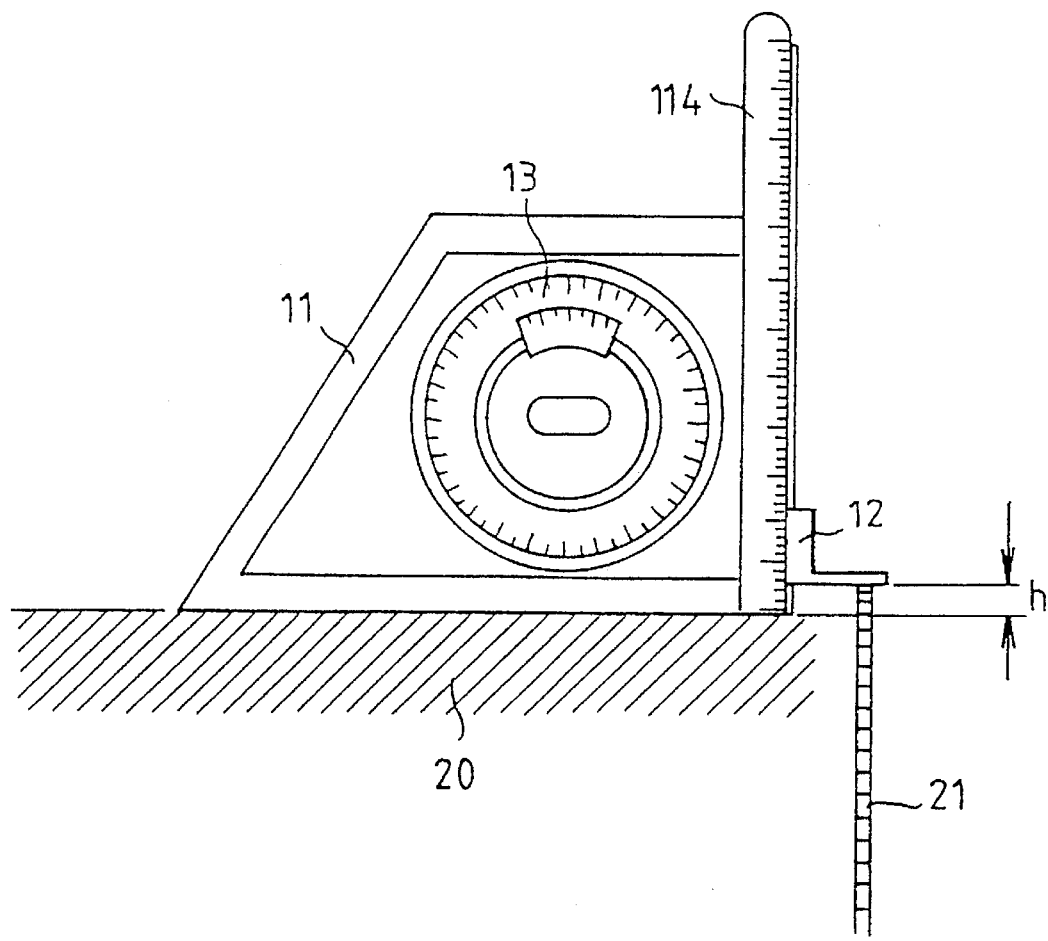
FIG. 2 is a schematic view of the first preferred embodiment of the present invention in actual use.

The multi-purpose measuring instrument 10 for wood working machines of the present invention assembled according to the above-described structure may be utilized in several ways as follows:

First, the body 11 is placed vertically on a working table 20 and is fastened thereto by means of its magnets 111. By loosening the bolt 124 on the slide block 12, the slide block is caused to move up or down. Its bottom edge portion 125 is just above a saw blade 21, and the height of the blade 21 may be obtained by looking at the graduation on the steel ruler 114 of the body 11, as shown in FIG. 2. Since the steel ruler 11 is adhered onto the body 11 by magnets and it is graduated on both sides in inches and centimeters respectively, either side of the ruler may be used in measurement simply by removing the ruler and placing it into position.

Figure 4:
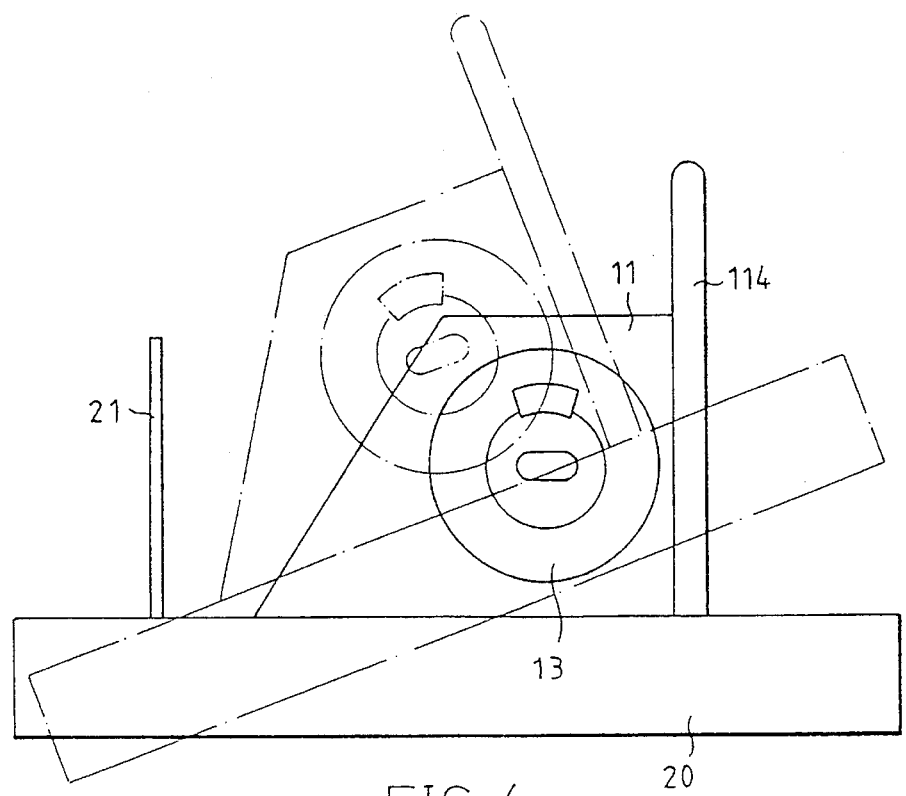
FIG. 4 and FIG. 5 are schematic views showing different actions of the first preferred embodiment of the present invention.
Figure 5:
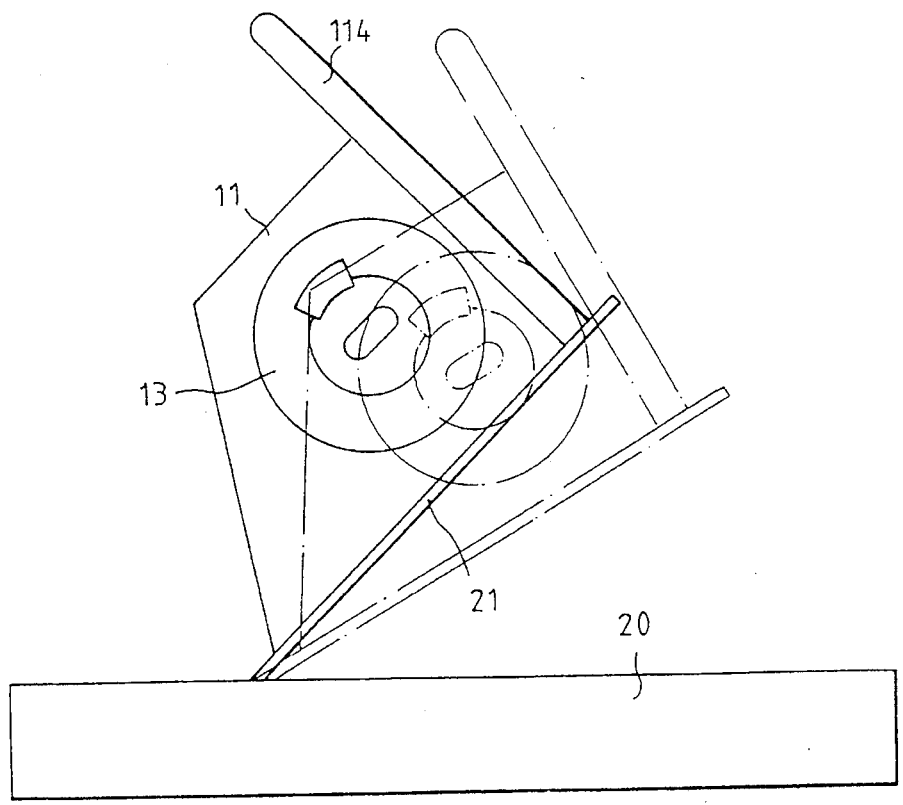

Second, when angle cutting is to be done as shown in FIGS. 4 and 5, two methods may be adopted. One is to adjust the blade 21; the other is to adjust the working table 20. When in use, the body 11 is first placed on the working table 20, and the upper and lower outer rings 131, 132 are adjusted and are set to zero by means of the bubble tube 135 of the level set 13. As shown in FIG. 3, when the outer rings 131, 132 are turned, the graduated ring 1314 is turned therewith, and the bubble which is in the central position of the bubble tube 135 is set to 0 degree. After the upper and lower outer rings 131, 132 have been set to zero, push up the upper and lower inner rings 133, 134, so that the upper inner ring 133 disengages from the upper flange 117 within the circular hole 115 and the lower inner ring 134 is in the greater space at the lower flange 118 within the circular hole 115. The inner rings then may rotate through a preset angle (bringing the bubble tube 135 to rotate therewith and causing the bubble to incline so that it is not in a level position). The inner rings 133, 134 are then pushed downward to be positioned within the circular hole 115 (with the upper inner ring 133 pressing against the upper flange 117 of the circular hole 115). Then the body 11 is vertically placed and adhered to the blade 21 or the working table 20 by means of magnets 111 on its bottom side. As shown in FIGS. 4 and 5, when the angle of the blade 21 or the working table 20 is adjusted, the body 11 also moves through an angle until the bubble within the bubble tube 135 of the level set 13 is in the central position. Then the blade 21 and the working table 20 are adjusted to the angle preset by the inner rings 133, 134. This operation is simple and time-saving. And before each adjustment, the upper outer ring 131 is first set to zero and an angle is preset by turning the inner rings 133, 134. Then the angle of the working table 20 or the blade 21 is slowly adjusted until the bubble within the bubble tube is in the central position. A precise angle is therefore easily obtained.

Figure 6:
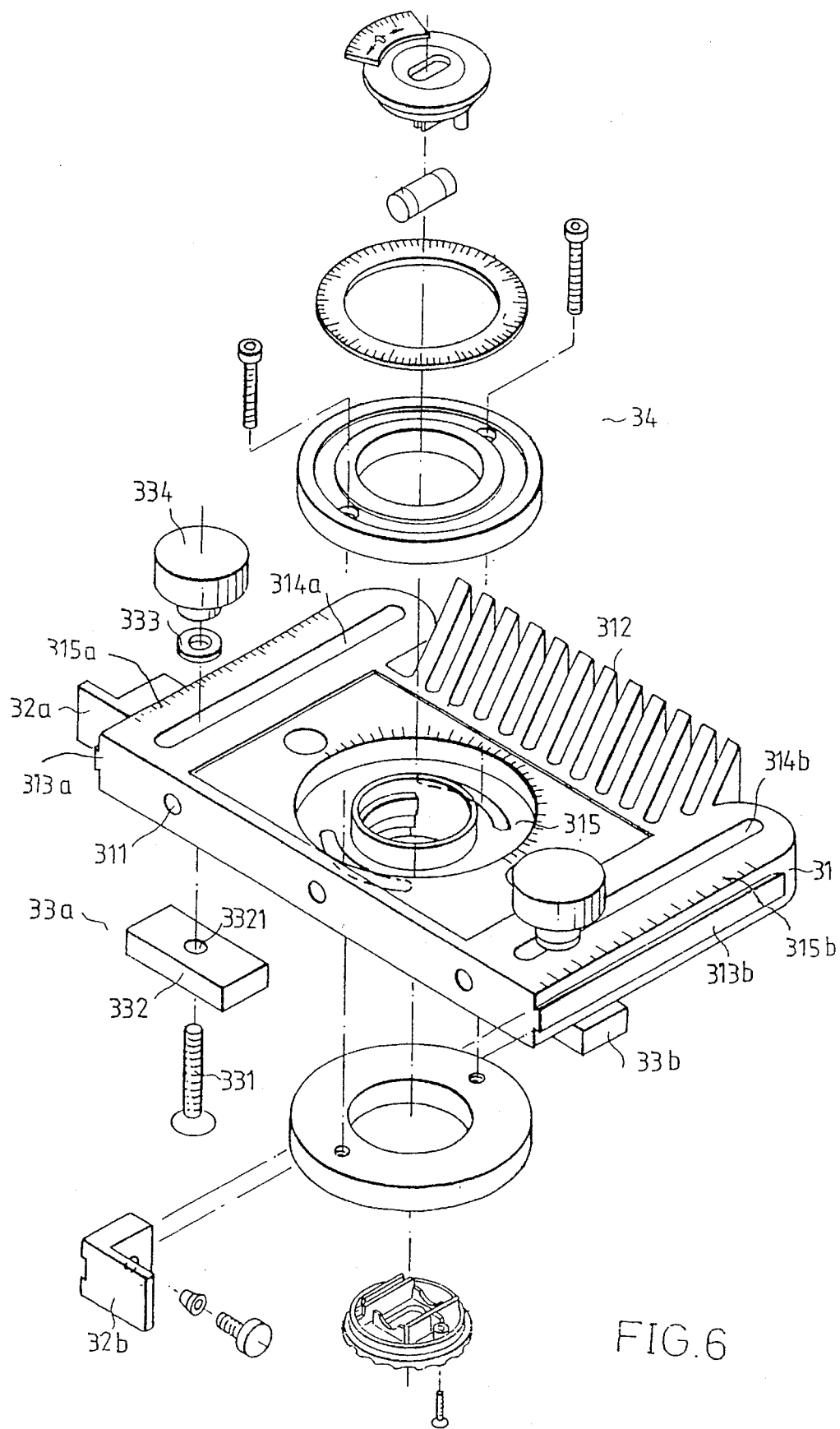
FIG. 6 is a partial perspective exploded view of the second preferred embodiment of the present invention.
Figure 7:
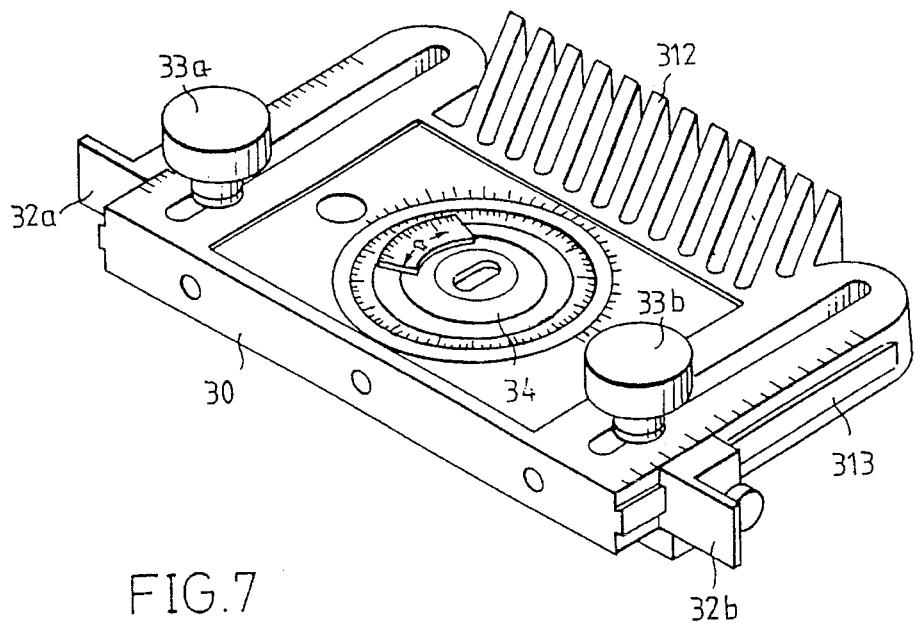
FIG. 7 is a perspective assembly view of the second preferred embodiment of the present invention.

FIG. 6 is a perspective exploded view of another preferred embodiment of the measuring instrument 30 of the present invention. This embodiment is developed from the basic structural principle of the above-described embodiment. This embodiment comprises a body 31, two slide blocks 32a, 32b, two clamp elements, 33a, 33b, and a level set 34. The body 31 is a substantially rectangular board having one of the horizontal sides provided with a plurality of magnets 311 spaced apart thereon. The body 31 may be vertically placed on the working table by means of the magnets 311. The other horizontal side of the body 31 extends perpendicularly, forming a backing block 312 of a multiplicity of right-angled triangular plates spaced apart thereon. The workpiece may be pressed against the backing block 312 when the body 31 is horizontally placed on the working table. The two vertical sides of the body 31 are provided with projecting dovetails 313a, 313b so that two slide blocks 32a, 32b may each move axially therealong. Two longitudinal grooves 314a, 314b are provided through either vertical sides of the body 31, and the respective edges of the vertical sides are provided with graduations 315a, 315b. These grooves 314a, 314b receive two clamp elements 33a, 33b which may slidably move therein. The center of the body 31 is provided with a circular hole 315 for accommodating the level set 34.

The structure of the slide blocks 32a, 32b and the level 34 of this embodiment is the same as that of the corresponding components in the first embodiment. Therefore, the structure of the dovetails 313a, 313b for engaging the slide blocks, and the circular hole 315 for holding the level set 34 in both embodiments is the same. Hence, it is not necessary to describe them in detail herein. The following description will focus on the components modified in the second embodiment.

The two clamp elements 33a, 33b are identical in structure and only one will be described in detail herein. The clamp element 33a consists of a screw 331, a rectangular clamp block 332, a pad 333 and a nut 334. The screw 331 first passes through a round hole 3321 in the center of the clamp block 332 and then through the working table from below and out through the groove 314a of the body 31. The pad 333 is then fitted onto the screw 331 and then the nut 334 is screwed thereon. When the body 31 is placed horizontally on the working table, the clamp blocks are pressed against the lower side of the working table. In this way the body 31 may move forward or backward on the working table to match the width of the workpiece. If the nut is tightened, then the backing block 312 of the body 31 may provide a support for the workpiece during cutting.

Figure 8:
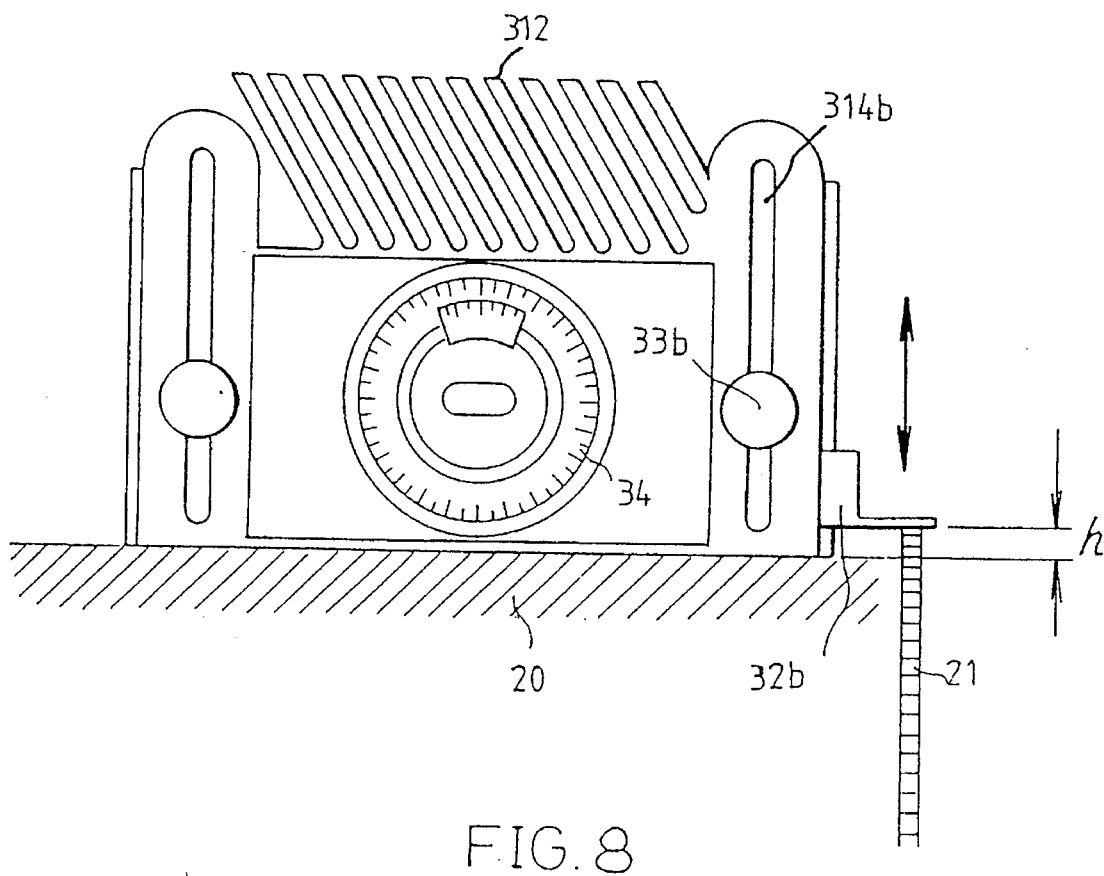
FIG. 8 through FIG. 11 are schematic views showing different actions of the second preferred embodiment of the present invention.
Figure 9:
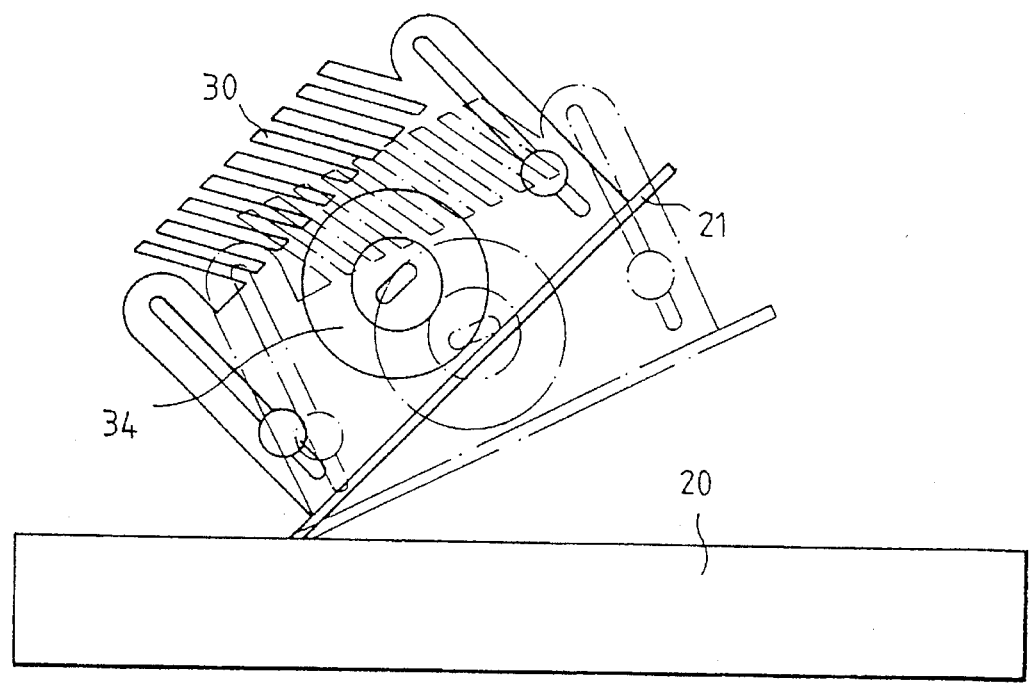
Figure 10:
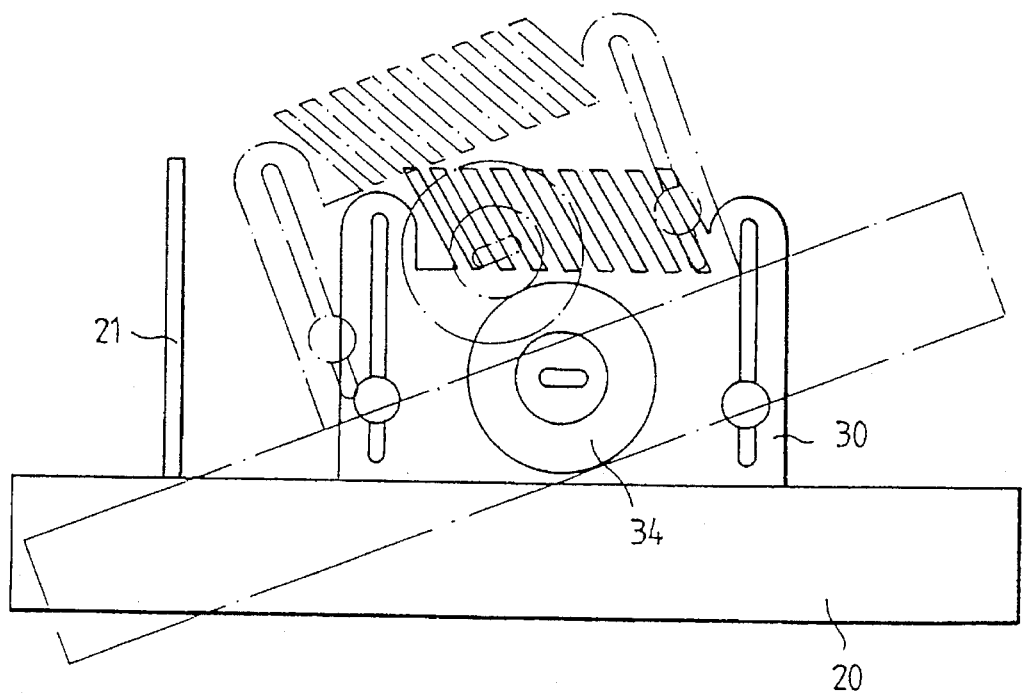

FIG. 8 shows the measuring instrument 30 used in measuring the height of the blade 21 by means of the slide block 32. FIGS. 9 and 10 show the level set 34 used in adjusting the angle of the blade 21 or the working table 20. The operating procedures are the same as those in the first embodiment, but the operation of the clamp element 33 is different and is described herein below.

Figure 11:
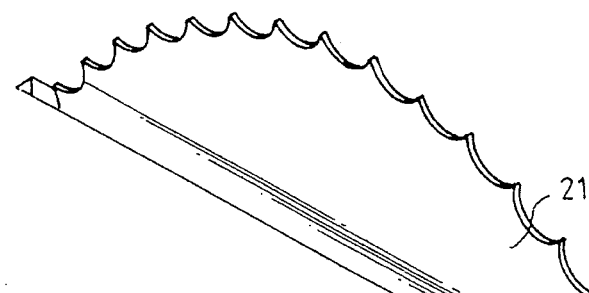
Figure 11:
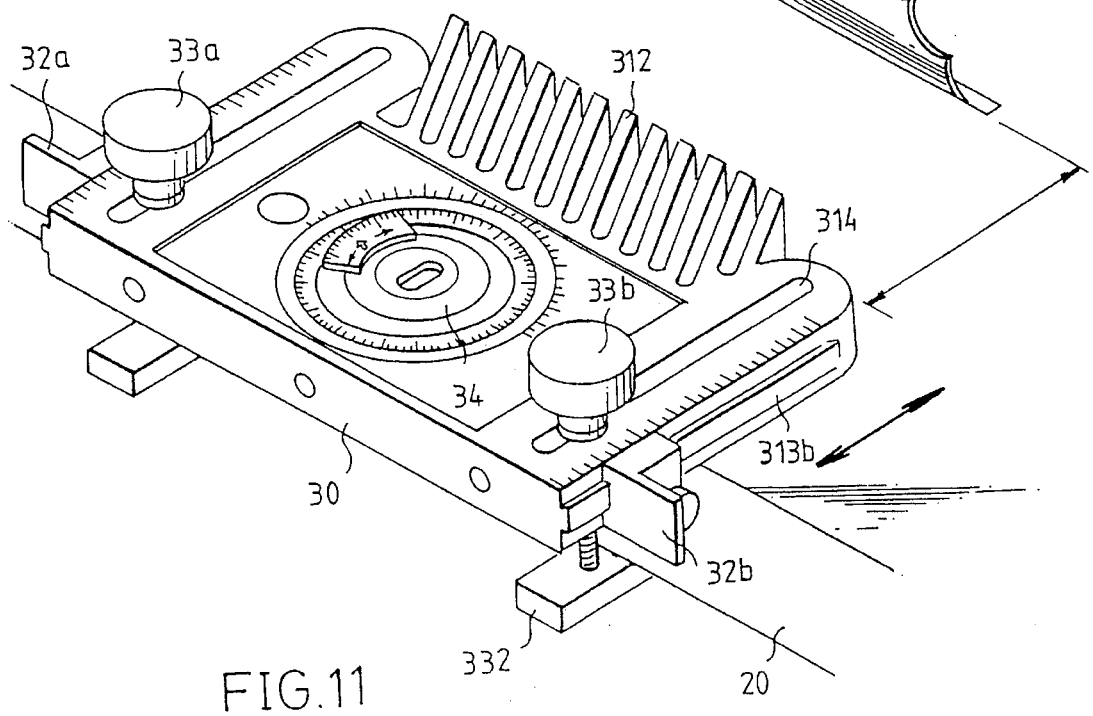

With reference to FIG. 11, the body 31 is placed horizontally on the working table 20 and is secured against the lower side of the working table 20 by means of the clamp blocks 332 of the two clamp elements 33a, 33b. The body 31 may slidably move by means of the groove 314 to match the width of the workpiece and to provide a backing support for the workpiece. The body 31 is clamped to one side of the working table 20, and one side of the workpiece is pressed against the backing block 312 of the body 31 and it is pushed in the direction of the blade 22 to be cut into pieces of the desired size.

In view of the aforesaid, the multi-purpose measuring instrument for wood working machines of the present invention makes ingenious use of space to provide several measuring functions in a single instrument. The present invention also eliminates the drawbacks in prior art, providing a product which is more practical and effective.

Although the present invention has been illustrated and described with reference to the preferred embodiment thereof, it should be understood that it is in no way limited to the details of such embodiment but is capable of numerous modifications within the scope of the appended claims.

What is claimed is:

1. A multi-purpose measuring instrument for wood working machines, said measuring instrument comprising a body having a horizontal side and a vertical side, said horizontal side being provided with a plurality of magnets and said vertical side being provided with slide blocks capable of longitudinal sliding movement and positioning for measuring the height of a blade, and a circular level set capable of axial rotation being movably and pivotally disposed in the center of said body and consisting of rotary inner rings and outer rings and a bubble tube having therein a bubble, wherein an angle adjustment is achieved by turning said inner and outer rings to a desired degree and adjusting the position of said bubble in said bubble tube.

2. The multi-purpose measuring instrument for wood working machines as claimed in claim 1, wherein said vertical side of said body is graduated on a longitudinal edge thereof and a projecting dovetailed strip located on said vertical side, said slide block corresponding in shape to said dovetailed strip and being an L-shaped block provided with a dovetailed groove in a longitudinal side thereof, and a bolt element being used to press against said dovetailed strip so that said slide block may be moved axially along said dovetailed strip and be positioned along said dovetailed strip.

3. The multi-purpose measuring instrument for wood working machines as claimed in claim 1, wherein said body is provided centrally with a circular hole having an I-shaped cross section, an upper opening, a lower opening, and two curved slots located in said body on opposite sides of said circular hole such that said circular hole connects said upper opening and said lower opening and that an upper flange and a lower flange of an inner wall of said circular hole separate said two curved slots; wherein said level set has an outer ring element and an inner ring element engageable with said upper flange and said lower flange of said circular hole, said outer ring element consisting of an upper outer ring and a low outer ring disposed in said upper opening and said lower opening of said circular-hole, said outer ring element further consisting of holes located in a circumferential edge thereof for receiving therein screws on said screws and outer ring element turns, said outer ring element further consisting of an upper inner ring which is located in said circular hole and of a lower inner ring which is located in said circular hole and is provided centrally with a rectangular hole and semi-circular plates for receiving said bubble tube; wherein said outer ring element is adjustable to align with said bubble of said bubble tube before said inner ring element is caused to disengage with said flanges of said circular hole and to rotate a predetermined angle to re reposition in said circular hole; and wherein said angel adjustment of a workpiece is attained by placing said level set on said workpiece before said bubble is adjusted to a central and level position in said bubble tube.

4. The multi-purpose measuring instrument as claimed in claim 3, wherein said upper inner ring is provided with a graduated sectoral plate.

* * * * *